(12) United States Patent
Wu et al.

(10) Patent No.: US 11,251,704 B2
(45) Date of Patent: Feb. 15, 2022

(54) SINGLE-INDUCTOR, MULTIPLE-OUTPUT, DC-DC CONVERTER

(71) Applicant: NXP USA, Inc., Austin, TX (US)

(72) Inventors: Xiaowen Wu, Shanghai (CN); Lei Tian, Shanghai (CN)

(73) Assignee: NXP USA, Inc., Austin, TX (US)

( * ) Notice: Subject to any disclaimer, the term of this patent is extended or adjusted under 35 U.S.C. 154(b) by 50 days.

(21) Appl. No.: 16/911,807

(22) Filed: Jun. 25, 2020

(65) Prior Publication Data

US 2021/0006160 A1  Jan. 7, 2021

(30) Foreign Application Priority Data

Jul. 1, 2019 (CN) .......................... 201910587019.3

(51) Int. Cl.
*H02M 3/158* (2006.01)
*H02M 1/08* (2006.01)
*H02M 1/00* (2006.01)

(52) U.S. Cl.
CPC ............. *H02M 3/158* (2013.01); *H02M 1/08* (2013.01); *H02M 1/009* (2021.05)

(58) Field of Classification Search
CPC ........ H02M 1/009; H02M 1/08; H02M 1/088; H02M 1/096; H02M 1/14; H02M 1/15; H02M 1/32; H02M 3/156; H02M 3/158; H02M 3/1584

See application file for complete search history.

(56) References Cited

U.S. PATENT DOCUMENTS 6,977,447 B2    12/2005    May
8,049,472 B2 * 11/2011    Easwaran ............. H02M 3/158
                                                                                               323/267
(Continued)

FOREIGN PATENT DOCUMENTS

JP           2013223286       * 10/2013             H02M 3/158

OTHER PUBLICATIONS

Furukawa et al.: "Improvement in Transient Response of Fast P Control DC-DC Converter with Static Model", 2015 International Conference on Renewable Energy Research and Applications (ICRERA), Nov. 22-25, 2015, Palermo, Italy, pp. 1104-1107.

(Continued)

*Primary Examiner* — Matthew V Nguyen

(57) ABSTRACT

A single-inductor, multiple-output, DC-DC converter has regulation circuitry that controls switches to alternately charge at least two capacitors associated with at least two DC output voltages via the single inductor from a DC input port. The regulation circuitry determines whether the DC-DC converter is operating in continuous conduction mode (CCM) or discontinuous conduction mode (DCM). In CCM mode, the regulation circuitry regulates the charging duty cycle for a first output voltage and generates the initial charging duty cycle for regulating each other output voltage by scaling the first output voltage duty cycle. In DCM mode, the regulation circuitry independently regulates the charging duty cycles for each output voltage and stores each duty cycle to be used for the next charging period for the same output voltage. The regulation circuitry detects and handles undershoot and overshoot conditions to accelerate recovery at the output ports.

14 Claims, 5 Drawing Sheets

(56) References Cited

U.S. PATENT DOCUMENTS

2012/0062031 A1* 3/2012 Buthker .............. H02M 3/158
307/31
2021/0281173 A1* 9/2021 Eirea .................... H02M 1/00

OTHER PUBLICATIONS

Leung et al.: "Dynamic Hysteresis Band Control of the Buck Converter with Fast Transient Response", IEEE Transactions on Circuits and Systems II: Express Briefs (vol. 52, Issue: 7, Jul. 2005), pp. 398-402.

Mingyang et al.: "A fixed-frequency fast transient response DC-DC controller for VRMs", Journal of Semiconductors, Dec. 2013, vol. 34, No. 12, pp. 125002-1-125002-6.

* cited by examiner

SINGLE-INDUCTOR, MULTIPLE-OUTPUT, DC-DC CONVERTER

CROSS-REFERENCE TO RELATED APPLICATIONS

This application claims the priority under 35 U.S.C. § 119 of China application no. 201910587019.3, filed on 1 Jul. 2019, the contents of which are incorporated by reference herein.

BACKGROUND

The present invention relates to a DC-DC converter and, more particularly, to a single-inductor, multiple-output, DC-DC converter.

Single-inductor, multiple-output, DC-DC converters that generate two or more different DC output voltages from a single DC input voltage using a single inductor are known, for example, in U.S. Pat. Nos. 6,204,651 and 6,977,447.

FIG. 4 of the '447 patent shows a single-inductor, two-output, DC-DC boost converter. The boost converter alternates between phases in which energy is transferred from a battery to the inductor and phases in which energy is transferred from the inductor to one of two capacitors that generate the two DC output voltages. In addition, the boost converter alternates between periods of charging the first capacitor associated with the first DC output voltage and periods of charging the second capacitor associated with the second DC output voltage based on which of the two DC output voltages is relatively more deficient compared to its target voltage level.

FIG. 6 of the '447 patent shows a single-inductor, two-output, DC-DC buck converter. The buck converter alternates between a phase in which the inductor and one of two capacitors that generate the two DC output voltages are charged by a battery and a phase in which the inductor is discharged. In addition, the buck converter alternates between periods of charging the first capacitor associated with the first DC output voltage and periods of charging the second capacitor associated with the second DC output voltage based on which of the two DC output voltages is relatively more deficient compared to its target voltage level.

In both of these single-inductor, two-output, DC-DC converters, one of the two DC output voltages is selected to be the primarily regulated output voltage, such that the duty cycle of the charging signal used to charge and discharge the inductor for the primarily regulated output voltage is independently regulated by the converter's regulation module. The initial duty cycle for the charging signal used to charge and discharge the inductor for the other output voltage is generated by scaling the most-recent duty cycle for the primarily regulated output voltage by a fixed scale factor that is based on the different target voltage levels for the two output voltages. Thus, the regulation of the other output voltage is dependent on the regulation of the primarily regulated output voltage.

While the DC-DC converters of the '447 patent perform well with relatively low levels of output ripple when the converters operate in a continuous conduction mode (CCM), these converters do not perform as well and have relatively high levels of output ripple when the converters operate in a discontinuous conduction mode (DCM). In CCM mode, current continuously flows through the inductor. Under certain circumstances (e.g., light output loading), the inductor current may go from positive to negative and then from negative to positive, but, other than the instant when the inductor current transitions from positive to negative or from negative to positive, current continuously flows through the inductor. In DCM mode, on the other hand, the inductor current will reach zero and stay at zero for different periods of time without ever going negative.

Accordingly, it would be advantageous to reduce the output ripple in a single-inductor, multiple output DC-DC converter.

BRIEF DESCRIPTION OF THE DRAWINGS

Embodiments of the present invention are illustrated by way of example and are not limited by the accompanying figures, in which like references indicate similar elements. Elements in the figures are illustrated for simplicity and clarity and have not necessarily been drawn to scale. For example, the thicknesses of layers and regions may be exaggerated for clarity.

DETAILED DESCRIPTION

Figure 1:
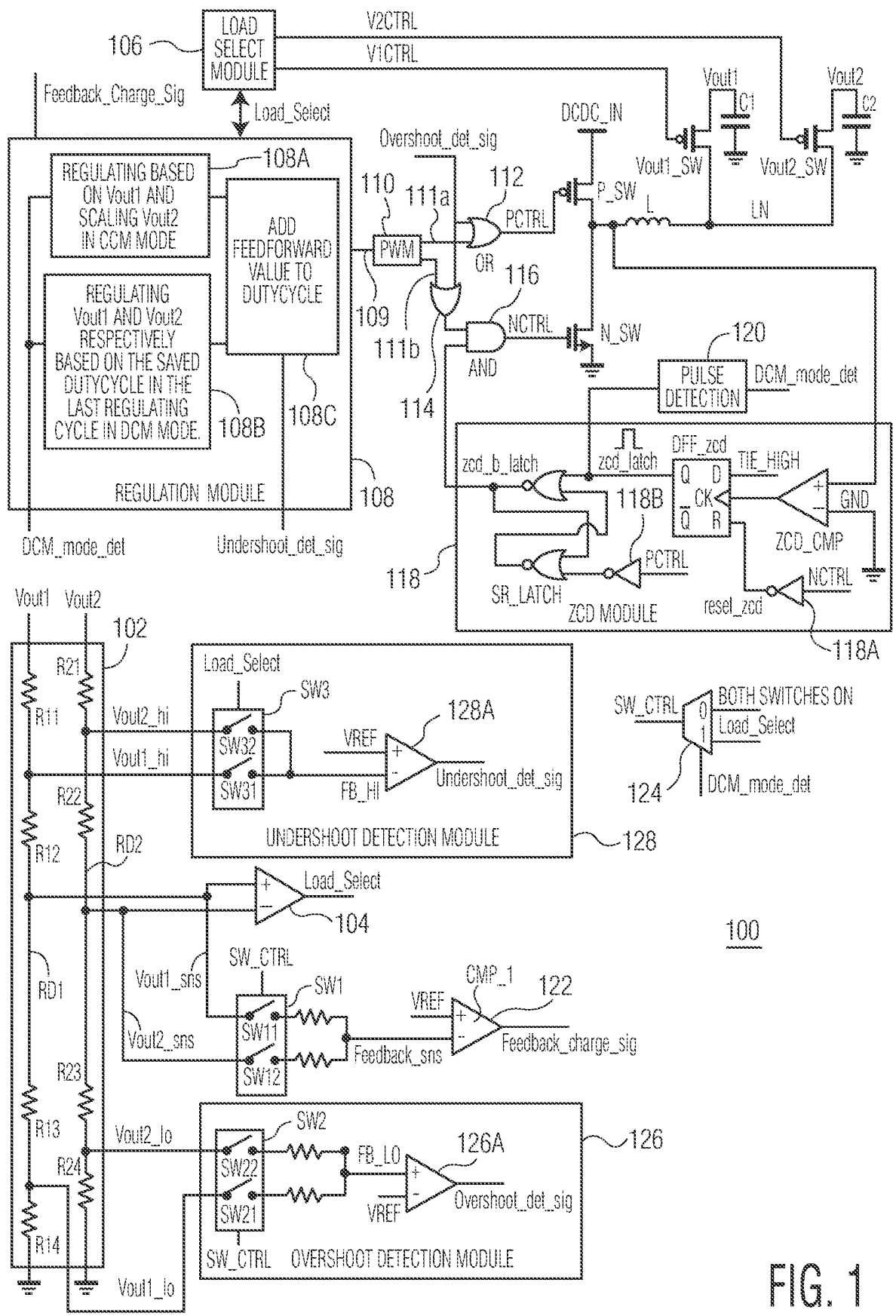
FIG. 1 is a schematic circuit diagram of a single-inductor, two-output, buck-type, DC-DC converter according to one embodiment of the present invention.

Detailed illustrative embodiments of the present invention are disclosed herein. However, specific structural and functional details disclosed herein are merely representative for purposes of describing example embodiments of the present invention. Embodiments of the present invention may be embodied in many alternative forms and should not be construed as limited to only the embodiments set forth herein. Further, the terminology used herein is for the purpose of describing particular embodiments only and is not intended to be limiting of example embodiments of the invention.

As used herein, the singular forms "a", "an", and "the", are intended to include the plural forms as well, unless the context clearly indicates otherwise. It further will be understood that the terms "comprises", "comprising", "has", "having", "includes", or "including" specify the presence of stated features, steps, or components, but do not preclude the presence or addition of one or more other features, steps, or components. It also should be noted that, in some alternative implementations, the functions/acts noted might occur out of the order noted in the figures. For example, two figures shown in succession may in fact be executed substantially concurrently or may sometimes be executed in the reverse order, depending upon the functionality/acts involved. The term "or" is to be interpreted as inclusive unless indicated otherwise.

As described previously, a two-output, DC-DC converter of the '447 patent has a first, so-called "primarily regulated" output voltage and a second, so-called "other" output voltage. The DC-DC converter regulates the duty cycle of the charging signal used to control the primarily regulated output voltage and generates the initial duty cycle for the charging signal used to control the other output voltage by applying a fixed scale factor to the most-recent duty cycle for the primarily regulated output voltage. When such a DC-DC converter operates in CCM mode, the DC-DC converter transitions between periods of charging the capacitors for the two different output voltages with relatively little output ripple in the output voltages. However, when that same fixed scale factor is used to generate the initial duty cycle for the other output voltage when the DC-DC converter is operating in DCM mode, significant output ripple occurs in one or both output voltages following transitions between the capacitor-charging periods for the two output voltages.

According to certain embodiments of the invention, the control of a single-inductor, multiple-output, DC-DC converter is designed to provide reduced output ripple during both CCM and DCM operations.

In one embodiment, the present invention is a single inductor, multiple-output, DC-DC converter that converts a DC input voltage at an input port into at least first and second output voltages at respective first and second output ports. The DC-DC converter comprises an inductor, at least first and second capacitors respectively connected to the first and second output ports, a plurality of switches that selectively connect the input port to either the first capacitor or the second capacitor via the inductor, and regulation circuitry that controls the switches. The regulation circuitry determines whether the DC-DC converter is operating in continuous conduction mode (CCM) or discontinuous conduction mode (DCM). For the CCM mode, (i) the regulation circuitry regulates the first output voltage and (ii) the regulation circuitry regulates the second output voltage dependent on the regulation of the first output voltage. For the DCM mode, (i) the regulation circuitry regulates the first output voltage independent of the regulation of the second output voltage and (ii) the regulation circuitry regulates the second output voltage independent of the regulation of the first output voltage.

Referring now to FIG. 1, a schematic circuit diagram of a single-inductor, two-output, buck-type, DC-DC converter 100 according to one embodiment of the present invention is shown. The converter 100 has a single inductor L and two capacitors C1 and C2 that are selectively charged and discharged based on four switch-control signals V1CTRL, V2CTRL, PCTRL, and NCTRL respectively applied to the gates of four transistor switches Vout1_SW, Vout2_SW, P_SW, and N_SW to convert a DC input voltage DCDC_IN into two different DC output voltages Vout1 and Vout2.

For the following discussion, Vout1 is assumed to be the "primarily regulated" output voltage, and Vout2 is the "other" output voltage. Those skilled in the art will understand how to operate the DC-DC converter 100 when Vout2 is the primarily regulated output voltage and Vout1 is the other output voltage.

The switch-control signals V1CTRL and V2CTRL respectively control the p-type switches Vout1_SW and Vout2_SW to control whether the capacitor C1 or the capacitor C2 is being charged. In particular, to charge capacitor C1 (and thereby control Vout1), V1CTRL is driven low to turn on Vout1_SW, and V2CTRL is driven high to turn off Vout2_SW, thereby allowing energy stored in the inductor L to flow to the capacitor C1. Similarly, to charge capacitor C2 (and thereby control Vout2), V1CTRL is driven high to turn off Vout1_SW, and V2CTRL is driven low to turn on Vout2_SW, thereby allowing energy stored in the inductor L to flow to the capacitor C2.

The switch-control signals PCTRL and NCTRL respectively control the p-type charging switch P_SW and the n-type discharging switch N_SW to control whether the inductor L is being charged from DCDC_IN or discharged. In particular, to charge the inductor L from DCDC_IN, PCTRL and NCTRL are both driven low to turn on P_SW and turn off N_SW, thereby allowing energy to flow from DCDC_IN to the inductor L and thereby to the currently selected output voltage Vout1 or Vout2. Similarly, to discharge the inductor L, PCTRL and NCTRL are both driven high to turn off P_SW and turn on N_SW, thereby stopping charging the inductor, while still allowing energy in the inductor to flow to the currently selected output Vout1 or Vout2.

The rest of FIG. 1 shows the regulation circuitry for the converter 100 that generates the four switch-control signals V1CTRL, V2CTRL, PCTRL, and NCTRL that control the four switches Vout1_SW, Vout2_SW, P_SW, and N_SW, respectively. As described further below, the regulation circuitry selects the output voltage Vout1 or Vout2 that is more deficient relative to its desired voltage level to be the currently selected output voltage. As a result, the regulation circuitry alternates between periods of charging the output voltage Vout1 and periods of charging the output voltage Vout2.

In addition, the regulation circuitry repeatedly turns on and off the switches P_SW and N_SW in a complementary manner to charge the capacitor C1 or C2 corresponding to the currently selected output voltage Vout1 or Vout2. The resulting current flowing intermittently from the input port DCDC_IN to the inductor L may be characterized as a charging signal for the currently selected output voltage Vout1 or Vout2, the charging signal having a duty cycle corresponding to the timing of the turning on and off of the switches P_SW and N_SW, where a higher duty cycle corresponds to more charging of the inductor L from DCDC_IN. The charging signal is high during the charge phase of each charge-discharge cycle for the inductor L in which P_SW is on and N_SW is off, and low during the discharge phase of each charge-discharge cycle for the inductor L in which P_SW is off and N_SW is on.

The regulation circuitry also determines whether the DC-DC converter 100 is operating in CCM mode or DCM mode and controls the duty cycle of the charging signal differently for the two different modes. In particular, if the regulation circuitry determines that the DC-DC converter 100 is operating in CCM mode, then the regulation circuitry (i) regulates the duty cycle of the charging signal used to control the primarily regulated output voltage Vout1 and (ii) similar to the technique described in the '447 patent, generates the initial duty cycle of the charging signal used to control the other output voltage Vout2 by applying a scale factor (based on the relative desired output voltage levels for Vout1 and Vout2) to the most-recent duty cycle of the charging signal for the primarily regulated output voltage Vout1.

In CCM mode, when controlling the primarily regulated output voltage Vout1, the regulation circuitry stores, in local memory, information identifying the current duty cycle of the Vout1 charging signal. When the charging period switches to the other output voltage Vout2, the regulation circuitry retrieves the most-recent Vout1 duty cycle from memory and scales that value to generate the initial duty cycle for the charging signal for the output voltage Vout2. When the charging period switches back to the output voltage Vout1, the regulation circuitry retrieves the most-recent Vout1 duty cycle from memory and uses that value as the initial duty cycle for the charging signal for the output voltage Vout1. In this way, the regulation circuitry may be said to independently control the Vout1 duty cycle, but dependently control the Vout2 duty cycle based on the Vout1 duty cycle. Note that the regulation circuitry also stores, in local memory, the current Vout2 duty cycle, but only the stored Vout1 duty cycle is used during CCM mode (i.e., directly for Vout1 and scaled for Vout2).

In an alternative embodiment, instead of retrieving and using the previous Vout1 duty cycle as the initial duty cycle for the current Vout1 charging period during CCM operation, the regulation circuitry "de-scales" the most-recent Vout2 duty cycle to generate the initial duty cycle for the current Vout1 charging period. In this embodiment, for CCM mode, the regulation of Vout2 would be dependent on the regulation of Vout1, and the regulation of Vout1 would be dependent on the regulation of Vout2.

In another alternative embodiment, during CCM operation, the regulation circuitry generates the initial duty cycle for the current Vout1 charging period by selecting the maximum of (i) the previous Vout1 duty cycle and (ii) a "de-scaled" version of the most-recent Vout2 duty cycle. Similarly, the regulation circuitry generates the initial duty cycle for the current Vout2 charging period by selecting the maximum of (i) the previous Vout2 duty cycle and (ii) a scaled version of the most-recent Vout1 duty cycle. In this embodiment, for CCM mode, the regulation of Vout2 would be dependent on the regulation of Vout1, and the regulation of Vout1 would be dependent on the regulation of Vout2.

If the regulation circuitry determines that the DC-DC converter 100 is operating in DCM mode, then the regulation circuitry alternates between (i) charging periods of regulating the duty cycle of the charging signal used to control the output voltage Vout1 and (ii) charging periods of regulating the duty cycle of the charging signal used to control the output voltage Vout2, where the regulation of each output voltage is independent of the regulation of the other output voltage. In doing so, the regulation circuitry saves both duty cycles in local memory so that, at the beginning of a charging period for one of the output voltages, the regulation circuitry retrieves the stored duty cycle from the previous charging period for that output voltage and uses that value as the initial duty cycle for the current charging period for that output voltage.

Note that, when the operation of the DC-DC converter 100 switches from CCM mode to DCM mode, the regulation circuitry retrieves and uses the stored Vout1 duty cycle from the previous CCM charging period for Vout1 as the initial duty cycle for the first DCM charging period for Vout1. Similarly, the regulation circuitry retrieves and uses the stored Vout2 duty cycle from the previous CCM charging period for Vout2 as the initial duty cycle for the first DCM charging period for Vout2.

In addition, the regulation circuitry detects both voltage overshoot and undershoot conditions. If the regulation circuitry detects an overshoot condition in which the currently selected output voltage is determined to be too high, then the regulation circuitry controls the switches P_SW and N_SW to lower that output voltage. In one possible implementation, in DCM mode, the regulation circuitry decreases the duty cycle of the charging signal to zero by maintaining the switch P_SW off and maintaining the switch N_SW on until the inductor current decreases to zero. The switch N_SW is then turned off, and the switches N_SW and P_SW are both maintained off to enable the capacitor C1 or C2 corresponding to the currently selected output voltage Vout1 or Vout2 to be discharged by the loading until the output overshoot condition no longer exists.

If the regulation circuitry detects an undershoot condition in which the currently selected output voltage is determined to be too low, then the regulation circuitry controls the switches P_SW and N_SW to raise that output voltage. In one possible implementation, the regulation circuitry increases the initial duty cycle of the charging signal by a specified amount so that the currently selected output voltage can be charged up more quickly with the higher initial duty cycle when undershoot occurs, so the output can recover from undershoot sooner.

To perform these various regulation functions, the regulation circuitry of the DC-DC converter 100 includes a resistor network 102, a comparator 104, a load-select module 106, a regulation module 108, a pulse-width modulation (PWM) module 110, OR gates 112 and 114, an AND gate 116, a zero-cross detection (ZCD) module 118, a pulse-detection module 120, a comparator 122, a switch module SW1, a switch-control module 124, an overshoot detection module 126, and an undershoot detection module 128.

The resistor network 102 has two resistor dividers RD1 and RD2, each with four resistors: R11-R14 in RD1 and R21-R24 in RD2, where the output voltage Vout1 is applied to the resistor divider RD1 and the output voltage Vout2 is applied to the resistor divider RD2. The resistance levels of the resistors R11-R14 and R21-R24 are selected to generate three different pairs of divided-down, sensed, feedback voltages: (1) Vout1_hi and Vout2_hi between R11 and R12 and between R21 and R22, respectively, that are used by the undershoot detection module 128 as described further below; (2) Vout1_sns and Vout2_sns between R12 and R13 and between R22 and R23, respectively, that are used as described further below; and (3) Vout1_lo and Vout2_lo between R13 and R14 and between R23 and R24, respectively, that are used by the overshoot detection module 126 as described further below.

The divided-down, sensed, feedback voltages Vout1_sns and Vout2_sns are compared by the comparator 104 to generate the load-select control signal Load_Select. When Vout1_sns is greater than Vout2_sns, then Load_Select will be high; otherwise, Load_Select will be low. The resistance levels of the resistors R11-R14 and R21-R24 are selected based on the relative magnitudes of the target voltage levels for Vout1 and Vout2 such that the sensed feedback voltages Vout1_sns and Vout2_sns will be equal when Vout1 and Vout2 are both at their target voltage levels. For example, if the target voltage level for Vout1 is 9 volts and the target voltage level for Vout2 is 5 volts, then, in one possible implementation, the resistor network 102 is designed to divide Vout1 by 9 and Vout2 by 5, such that, when Vout1=9V and Vout2=5V, Vout1_sns and Vout2_sns will both equal 1V. As such, the load-select control signal Load_Select will indicate which of the two outputs Vout1 and Vout2 is more deficient relative to its target voltage level. In particular, when Vout2 is more deficient than Vout1, Load_Select will be high, and, when Vout1 is more deficient than Vout2, Load_Select will be low.

The load-select control signal Load_Select is applied to the load-select module 106, which generates switch-control signals V1CTRL and V2CTRL. When Vout2 is more deficient than Vout1 and Load_Select is high, then the load-select module 106 will generate V1CTRL to be high and V2CTRL to be low to enable capacitor C2 to be connected to and charged by the inductor L. On the other hand, when Vout1 is more deficient than Vout2 and Load_Select is low, then the load-select module 106 will generate V1CTRL to be low and V2CTRL to be high to enable capacitor C1 to be connected to and charged by the inductor L.

The regulation module 108 generates a regulation signal 109 that controls the duty cycle of the charging signal used to charge the capacitor C1 or C2 for the currently selected output voltage Vout1 or Vout2. The regulation signal 109 is applied to the PWM module 110, which generates PWM pulse streams 111a and 111b having PWM pulses with duty cycles dictated by the regulation signal 109. The pulse stream 111a is applied to the OR gate 112, which generates the switch-control signal PCTRL, while the pulse stream 111b is applied to the OR gate 114, whose output is applied to the AND gate 116, which generates the switch-control signal NCTRL.

The PWM pulse streams 111a and 111b contain similar PWM pulses where the pulse transitions are slightly offset from one another in time to avoid both switches P_SW and N_SW being on at the same time. In particular, the rising edges of the PWM pulses in the pulse stream 111a slightly lead the rising edges of the PWM pulses in the pulse stream 111b to ensure that switch P_SW is turned off before switch N_SW is turned on. Similarly, the falling edges of the PWM pulses in the pulse stream 111b slightly lead the falling edges of the PWM pulses in the pulse stream 111a to ensure that switch N_SW is turned off before switch P_SW is turned on.

As explained further below, during normal CCM operating conditions when there is no overshoot condition, the overshoot-detection control signal Overshoot_det_sig from the overshoot detection module 126 is low and the ZCD control signal zcd_b_latch from the ZCD module 118 is high. In that case, the switch-control signal NCTRL generated by the AND gate 116 is equal to the pulse stream 111b, and the switch-control signal PCTRL generated by the OR gate 112 is equal to the pulse stream 111a. As such, during those normal CCM operating conditions, the n-type switch N_SW is turned off and the p-type switch P_SW is turned on when the pulse streams 111a and 111b are both low, and N_SW is turned on and P_SW is turned off when the pulse streams 111a and 111b are both high. Thus, the duty cycle of the PWM pulses in the pulse streams 111a and 111b determine how long, within each charge-discharge cycle, the switch P_SW is on and off, which in turn determines how much the inductor L and the currently selected capacitor C1 or C2 are charged from the input node DCDC_IN.

Because the switch P_SW is a p-type transistor switch, lower duty cycle for the pulse stream 111a implies more charging of the inductor L and the currently selected capacitor, and vice versa. Thus, a decrease in the duty cycle of the pulse stream 111a corresponds to an increase in the duty cycle of the charging signal applied to the inductor L and the capacitor for the currently selected output voltage, and vice versa.

The zero-cross detector (ZCD) module 118 and the pulse-detection module 120 determine whether the DC-DC converter 100 is operating in CCM mode or DCM mode. As described previously, when the current in the inductor L remains positive and never reaches zero, the DC-DC converter 100 is operating in CCM mode, while, in DCM mode, the inductor current does reach zero during the discharge phase of at least some of the charge-discharge cycles.

During each charging phase of the inductor L, the control signals PCTRL and NCTRL are both low, such that the switch P_SW is on and the switch N_SW is off. In that case, positive current will flow from the input port DCDC_in through P_SW to the node LP through the inductor L to the selected capacitor C1 or C2 through switch Vout1_SW or Vout2_SW. In that case, the voltage at the node LP will always be positive.

During each discharging phase of the inductor L, the control signals PCTRL and NCTRL are both high, such that the switch P_SW is off and the switch N_SW is on. In that case, the node LP will be connected to ground via N_SW. As long as the current through the inductor L remains positive (i.e., flowing from the node LP to the node LN in FIG. 1), the voltage at the node LP will be negative due to the voltage drop from ground across N_SW to the node LP. If and when the current through the inductor L goes negative (i.e., flowing from the node LN to the node LP in FIG. 1), the voltage at the node LP will be positive due to the voltage drop from the node LP across N_SW to ground.

The ZCD comparator ZCD_CMP compares the voltage at the node LP to the ground voltage GND. The output of the ZCD comparator ZCD_CMP is applied to the clock input port of the D-type, ZCD flip-flop DFF_zcd, whose D input port is pinned to a high signal TIE_HIGH and whose reset input port receives the ZCD reset signal reset_zcd from the inverter 118A, which receives the switch-control signal NCTRL. The output signal zcd_latch, which appears at the Q output port of DFF_zcd, is applied as the set signal to the set-reset (SR) latch SR_LATCH and to the pulse-detection module 120. The inverted value of the switch-control signal PCTRL from the inverter 118B is applied as the latch reset signal reset_latch to SR_LATCH, which generates the output signal zcd_b_latch.

In operation, during each inductor charging phase in which PCTRL and NCTRL are both low, the voltage at the node LP will be positive, the output of the comparator ZCD_CMP will be high, and the reset signals reset_zcd and reset_latch will both be high. As such, the flip-flop DFF_zcd will be reset such that the Q output zcd_latch will be low, and the latch SR_LATCH will also be reset such that the latch output zcd_b_latch will be high.

During each inductor discharging phase in which PCTRL and NCTRL are both high, the reset signals reset_zcd and reset_latch will both be low, thereby releasing the flip-flop DFF_zcd and the latch SR_LATCH from their reset states. In that case, as long as the inductor current L remains positive, the voltage at the node LP will remain negative, the output of the comparator ZCD_CMP will remain low, zcd_latch will remain low, and zcd_b_latch will remain high. If and when the inductor current L goes negative, the voltage at the node LP will go positive, the output of the comparator ZCD_CMP will be driven high, which will trigger the flip-flop DFF_zcd to drive zcd_latch high, which will drive zcd_b_latch low.

Driving zcd_b_latch low will result in NCTRL going low, which will turn off the switch N_SW, thereby preventing the inductor current from being driven further negative. NCTRL going low will also drive reset_zcd high, which will reset the flip-flop DFF_zcd and drive zcd_latch low again. Note that zcd_b_latch will remain low until the latch SR_LATCH is reset (i.e., at the beginning of the next inductor current charging phase when PCTRL is again driven low).

The pulse-detection module 120 detects zcd_latch being driven high as a pulse and drives the DCM mode-detection control signal DCM_mode_det high, indicating that the DC-DC converter 100 is currently operating in DCM mode. Note that, in some implementations, after a pulse is detected, the pulse-detection module 120 is configured to maintain DCM_mode_det high for a specified number (e.g., 16) of regulating cycles to avoid undesirable chattering between DCM and CCM modes.

As shown in FIG. 1, the regulation module 108 generates the regulation signal 109 based on a one-bit binary feedback charge signal Feedback_Charge_Sig generated by the comparator 122, which compares a sensed feedback voltage Feedback_sns to a reference voltage VREF (e.g., 1V for the previously described example of the resistor network 102). If Feedback_sns is less than VREF, then Feedback_charge_sig will be high indicating that the charging duty cycle for the selected output voltage needs to be increased. Otherwise, Feedback_charge_sig will be low indicating that the charging duty cycle for the selected output voltage needs to be decreased.

The sensed feedback voltage Feedback_sns is generated based on the state of the switches SW11 and SW12 in the switch module SW1 as controlled by the switch-control signal SW_CTRL, which is generated by the switch-control module 124. When DCM_mode_det is low, indicating that the DC-DC converter 100 is currently operating in CCM mode, the switch-control module 124 sets SW_CTRL to a value that turns on (i.e., closes) both switches SW11 and SW12 in the switch module SW1, which causes the Feedback_sns to be based on the common-mode voltage between Vout1_sns and Vout2_sns. This operating mode is referred to as the "common regulated" mode. When DCM_mode_det is high, indicating that the DC-DC converter 100 is currently operating in DCM mode, then the switch-control module 124 sets SW_CTRL to the load-select control signal Load_Select such that only the switch SW11 or SW12 in the switch module SW1 corresponding to the currently selected output voltage Vout1 or Vout2 is turned on, which causes the Feedback_sns to be based on only the corresponding voltage Vout1_sns or Vout2_sns, respectively. This operating mode is referred to as the "respectively regulated" mode.

Thus, when the DC-DC converter 100 is operating in CCM mode, the regulation module 108 is operated in the common regulated mode, and, when the DC-DC converter 100 is operating in DCM mode, the regulation module 108 is operated in the respectively regulated mode.

As shown in FIG. 1, the regulation module 108 has a CCM sub-module 108A and a DCM sub-module 108B. When the DC-DC converter 100 is operating in CCM mode (as indicated by DCM_mode_det being low), the CCM sub-module 108A generates the initial duty cycle for the other output voltage Vout2 by scaling the most-recent duty cycle for the primarily regulated output voltage Vout1 by a fixed scale factor that is based on the relative target voltage levels of the two output voltages. However, when the DC-DC converter 100 is operating in DCM mode (as indicated by DCM_mode_det being high), the DCM sub-module 108B alternately and independently regulates both output voltages Vout1 and Vout2, where the two duty cycles are stored in local memory such that the initial value for the duty cycle at the beginning of the next charging period for each output voltage is the corresponding stored value of the duty cycle for that output voltage from its previous charging period.

For CCM mode, both duty cycles are stored even though only the duty cycle for the primarily regulated output voltage is subsequently used, where the duty cycle for the other output voltage is generated by scaling the duty cycle for the primarily regulated output voltage by the fixed scaling factor. But note that, when a transition occurs from CCM mode to DCM mode, the stored duty cycles for both output voltages from CCM mode are used as the initial duty cycles for DCM mode.

Referring again to the resistor network 102, the low-voltage sensed voltages Vout1_lo and Vout2_lo generated by the resistor network 102 are respectively applied to the switches SW21 and SW22 of the switch module SW2 of the overshoot detection module 126. When the DC-DC converter 100 is operating in DCM mode such that DCM_mode_det is high, the regulation circuitry operates in the respectively regulated mode, and the switch-control signal SW_CTRL generated by the switch-control module 124 is equal to the load-select control signal Load_Select. In that case, when Load_Select is high indicating that Vout2 is the currently selected output voltage, the switch SW21 is open and the switch SW22 is closed, such that Vout2_lo is applied as a sensed low feedback voltage FB_LO to the overshoot comparator 126A. Similarly, when the DC-DC converter 100 is operated in DCM mode and Load_Select is low indicating that Vout1 is the currently selected output voltage, the switch SW21 is closed and the switch SW22 is open, such that Vout1_lo is applied as FB_LO to the overshoot comparator 126A.

On the other hand, when the DC-DC converter 100 is operated in CCM mode such that DCM_mode_det is low, the regulation circuitry operates in the common regulated mode, and the switch-control signal SW_CTRL generated by the switch-control module 124 causes both switches SW21 and SW22 in the switch module SW2 to be closed independent of the value of Load_Select, such that the common-mode voltage between Vout1_lo and Vout2_lo is applied as FB_LO to the overshoot comparator 126A.

In any case, the overshoot comparator 126A compares the sensed low feedback voltage FB_LO to the reference voltage VREF to generate the overshoot detection signal Overshoot_det_sig. If FB_LO is greater than VREF, then Overshoot_det_sig will be high indicating that an overshoot condition exists. Otherwise, Overshoot_det_sig will be low indicating that an overshoot condition does not exist. An overshoot condition will exist when the currently selected output voltage is significantly above its target voltage level.

The overshoot detection signal Overshoot_det_sig is applied (i) to the OR gate 112, which also receives the PWM pulse stream 111a, and (ii) to the OR gate 114, which also receives the PWM pulse stream 111b. The output of the OR gate 114 is applied to the AND gate 116, which also receives the ZCD output signal zcd_b_latch.

Under normal CCM operations in which an overshoot condition does not exist, zcd_b_latch from the ZCD module 118 is high and Overshoot_det_sig is low. In that case, the switch P_SW will be turned on and off based solely on the PWM pulse stream 111a, and the switch N_SW will be turned on and off based solely on the PWM pulse stream 111b.

If and when, however, during CCM operations, an overshoot condition is detected by the overshoot comparator 126A, Overshoot_det_sig will be driven high. In that case, PCTRL will be driven to remain high, independent of the PWM pulse stream 111a, and the switch P_SW will be driven to remain off, thereby stopping the charging of the inductor L from DCDC_IN. In addition, with Overshoot_det_sig and zcd_b_latch both high, NCTRL will be driven to remain high, independent of the PWM pulse stream 111b. In that case, the switch N_SW will be driven to remain on, and the inductor L will discharge. As the inductor L discharges, at some point the voltage level of the currently selected output voltage Vout1 or Vout2 will fall such that the feedback voltage FB_LO will again fall below VREF, such that the overshoot detection signal Overshoot_det_sig will again be low. In that case, PCTRL and NCTRL will again be determined solely by the PWM pulse signals 111a and 111b, respectively.

If and when the current in the inductor L reaches zero indicating that the DC-DC converter 100 is now operating in DCM mode, the ZCD module 118 will drive zcd_b_latch low, which will drive NCTRL low, which will turn off the switch N_SW. Driving NTRL low also causes the ZCD flip-flop DFF_zcd to reset, which, in turn, resets SR_latch, which drives zcd_b_latch high again, such that NCTRL will again be determined solely by the PWM pulse signal 111*b*. This enables the switch N_SW to be turned off if, in response to a detected overshoot condition, the inductor L is discharged to zero current. It also enables the switch N_SW to be turned off if the inductor L is discharged to zero current even when no overshoot condition is detected.

Referring again to the resistor network 102, the high-voltage sensed voltages Vout1_hi and Vout2_hi are respectively applied to the switches SW31 and SW32 of the switch module SW3 of the undershoot detection module 128. Unlike the overshoot detection module 126, the switch module SW3 of the undershoot detection module 128 is always controlled based on Load_Select, independent of whether the DC-DC converter 100 is operating in CCM mode or DCM mode, to ensure that the undershoot detector 128 always senses the more-deficient output voltage. As such, when Load_Select is high, the switch SW31 is open and the switch SW32 is closed, such that Vout2_hi is applied as a sensed high feedback voltage FB_HI to the undershoot comparator 128A. Similarly, when Load_Select is low, the switch SW31 is closed and the switch SW32 is open, such that Vout1_hi is applied as FB_HI to the undershoot comparator 128A.

In any case, the undershoot comparator 128A compares the sensed high feedback voltage FB_HI to the reference voltage VREF to generate an undershoot detection signal Undershoot_det_sig. If VREF is greater than FB_HI, then Undershoot_det_sig will be high indicating that an undershoot condition exists. Otherwise, Undershoot_det_sig will be low indicating that an undershoot condition does not exist. An undershoot condition will exist when the currently selected output voltage is significantly below its target voltage level.

The regulation module 108 receives the undershoot detection signal Undershoot_det_sig and, if an undershoot condition exists, at sub-module 108C, the regulation module 108 adjusts the regulation signal 109 based on a specified feedforward value to decrease the duty cycles of the pulse signals 111*a* and 111*b* in order to increase the duty cycle of the charging signal for the currently selected output voltage and thereby accelerate the recovery from the undershoot condition. In some implementations, the regulation signal 109 is adjusted by adding the specified feedforward value. In other implementations, the regulation signal 109 is adjusted by multiplying by the specified feedforward value.

Figure 2:
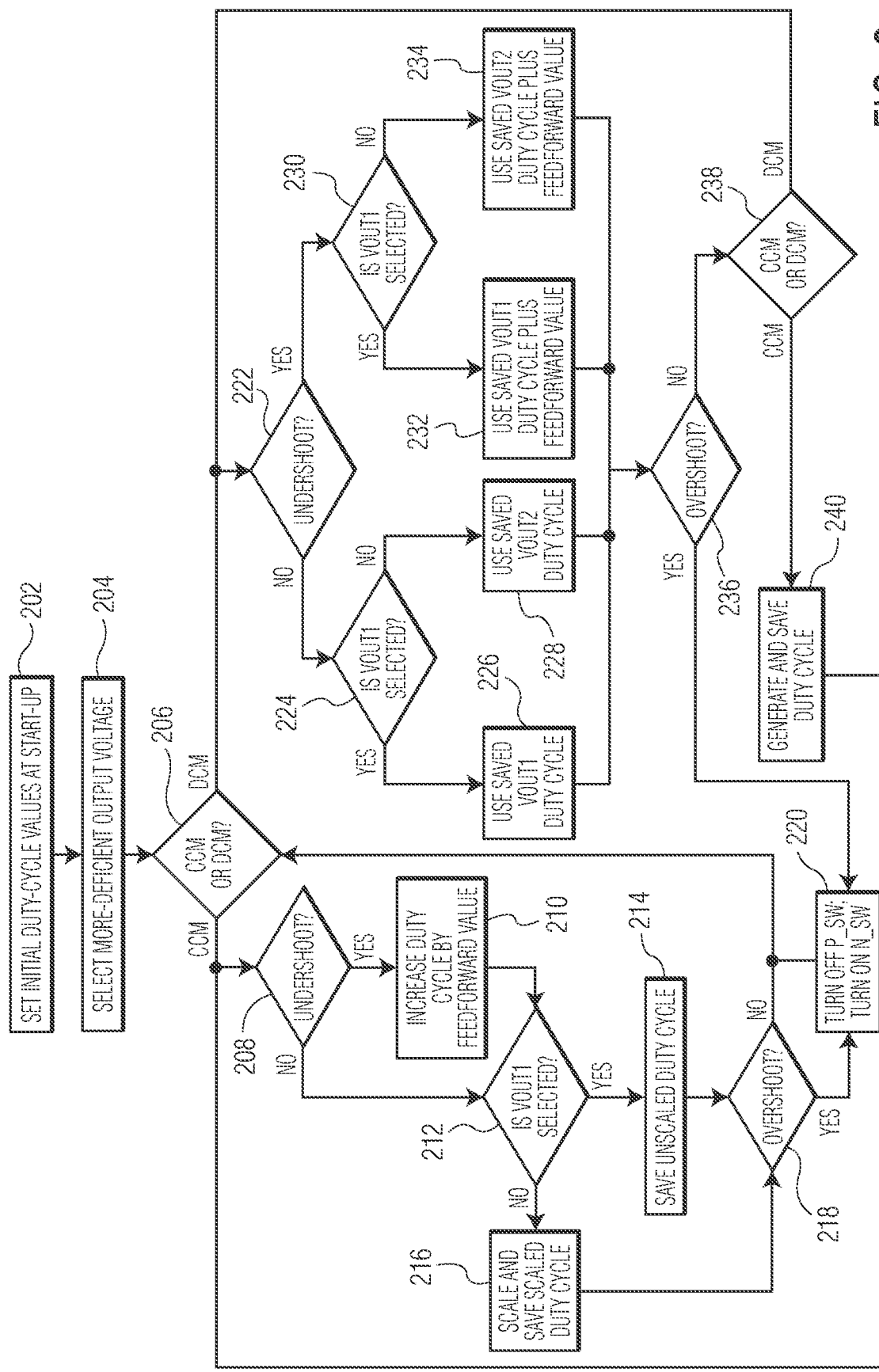
FIG. 2 is a flow chart of the operations of the DC-DC converter of FIG. 1.

FIG. 2 is a flow chart of the operations of the DC-DC converter 100 of FIG. 1 for charging either Vout1 or Vout2, where Vout1 is assumed to be the primarily regulated output voltage and Vout2 is the other output voltage. In step 202, at start-up of the DC-DC converter 100, initial values for the duty cycles for the two output voltages Vout1 and Vout2 are set, for example, to pre-programmed values.

In step 204, the comparator 104 determines whether Vout1 or Vout2 is to be charged based on which one is more deficient relative to its target voltage level.

In step 206, the ZCD module 118 and the pulse-detection module 120 determine whether the DC-DC converter 100 is operating in CCM or DCM mode.

If the DC-DC converter 100 is operating in CCM mode, then, in step 208, the undershoot detection module 128 determines whether or not an undershoot condition exists. If not, then processing proceeds to step 212. If an undershoot condition exists, then, in step 210, the regulation module 108 increases the duty cycle for the currently selected output voltage based on the specified feedforward value.

In step 212, the regulation module 108 determines whether the currently selected output voltage is the primarily regulated, first output voltage Vout1. If Vout1 is currently selected, then, in step 214, the regulation signal 109 for Vout1, which is generated by the regulation module 108 based on the feedback charge signal Feedback_charge_sig and saved in local memory, is applied to the PWM module 110 without any scaling. If, however, Vout2 is currently selected, then, in step 216, the regulation module 108 generates the initial regulation signal 109 for Vout2 by scaling the saved regulation signal for Vout1 based on the specified fixed scaling factor. The regulation signal 109 for Vout2 is also saved in local memory.

In either case, in step 218, the overshoot detection module 126 determines whether an overshoot condition exists. If not, then processing returns to step 206 for the next charge-discharge cycle. If an overshoot condition exists, then, in step 220, the OR gate 112 turns off the switch P_SW, and the AND gate 116 turns on the switch N_SW to discharge the inductor L until (i) the overshoot condition no longer exists or (ii) the current in the inductor L goes to zero. Processing then returns to step 206 for the next charge-discharge cycle.

If, in step 206, the ZCD module 118 and the pulse-detection module 120 determine that the DC-DC converter 100 is operating in DCM mode, then, in step 222, the undershoot detection module 128 determines whether or not an undershoot condition exists. If not, then processing proceeds to step 224. If an undershoot condition exists, then processing proceeds to step 230.

In step 224 (i.e., an undershoot condition does not exist), the regulation module 108 determines whether the currently selected output voltage is the primarily regulated, first output voltage Vout1. If Vout1 is currently selected, then, in step 226, the regulation module 108 retrieves the saved regulation signal from the previous charge-discharge cycle for Vout1 and generates the current regulation signal for Vout1 based on Feedback_charge_sig. If Vout2 is currently selected, then, in step 228, the regulation module 108 retrieves the saved regulation signal from the previous charge-discharge cycle for Vout2 and generates the current regulation signal for Vout2 based on Feedback_charge_sig. Processing then proceeds to step 236.

In step 230 (i.e., an undershoot condition does exist), the regulation module 108 determines whether the currently selected output voltage is the primarily regulated, first output voltage Vout1. If Vout1 is currently selected, then, in step 232, the regulation module 108 retrieves the saved regulation signal from the previous charge-discharge cycle for Vout1 and generates the current regulation signal for Vout1 based on Feedback_charge_sig, including adjusting the regulation signal based on the feedforward value. If Vout2 is currently selected, then, in step 234, the regulation module 108 retrieves the saved regulation signal from the previous charge-discharge cycle for Vout2 and generates the current regulation signal for Vout2 based on Feedback_charge_sig, including adjusting the regulation signal based on the feedforward value. Processing then proceeds to step 236.

In step 236, the overshoot detection module 126 determines whether an overshoot condition exists. If so, then processing proceeds to step 220 as described previously. If an over shoot condition does not exist, then, in step 238, the ZCD module 118 and the pulse-detection module 120 determine whether the DC-DC converter 100 is still operating in DCM mode. If so, then processing returns to step 206 for the next charge-discharge cycle. If not, then the DC-DC converter 100 has just transitioned to CCM mode and processing proceeds to step 240.

In step 240, the regulation module 108 generates the initial regulation signal for the currently selected output voltage Vout1 or Vout2 as the maximum value between (i) the saved regulation signal from the last charge-discharge cycle for Vout1 and (ii) the saved regulation signal from the last charge-discharge cycle for Vout2. Processing then proceeds to step 208 as before. Because the duty cycle in DCM is smaller than the duty cycle in CCM, there can be a big voltage drop at the output ports when transitioning from DCM mode to CCM mode. Selecting the maximum duty cycle in step 240 helps to handle such transitions with less output ripple.

Figure 3:
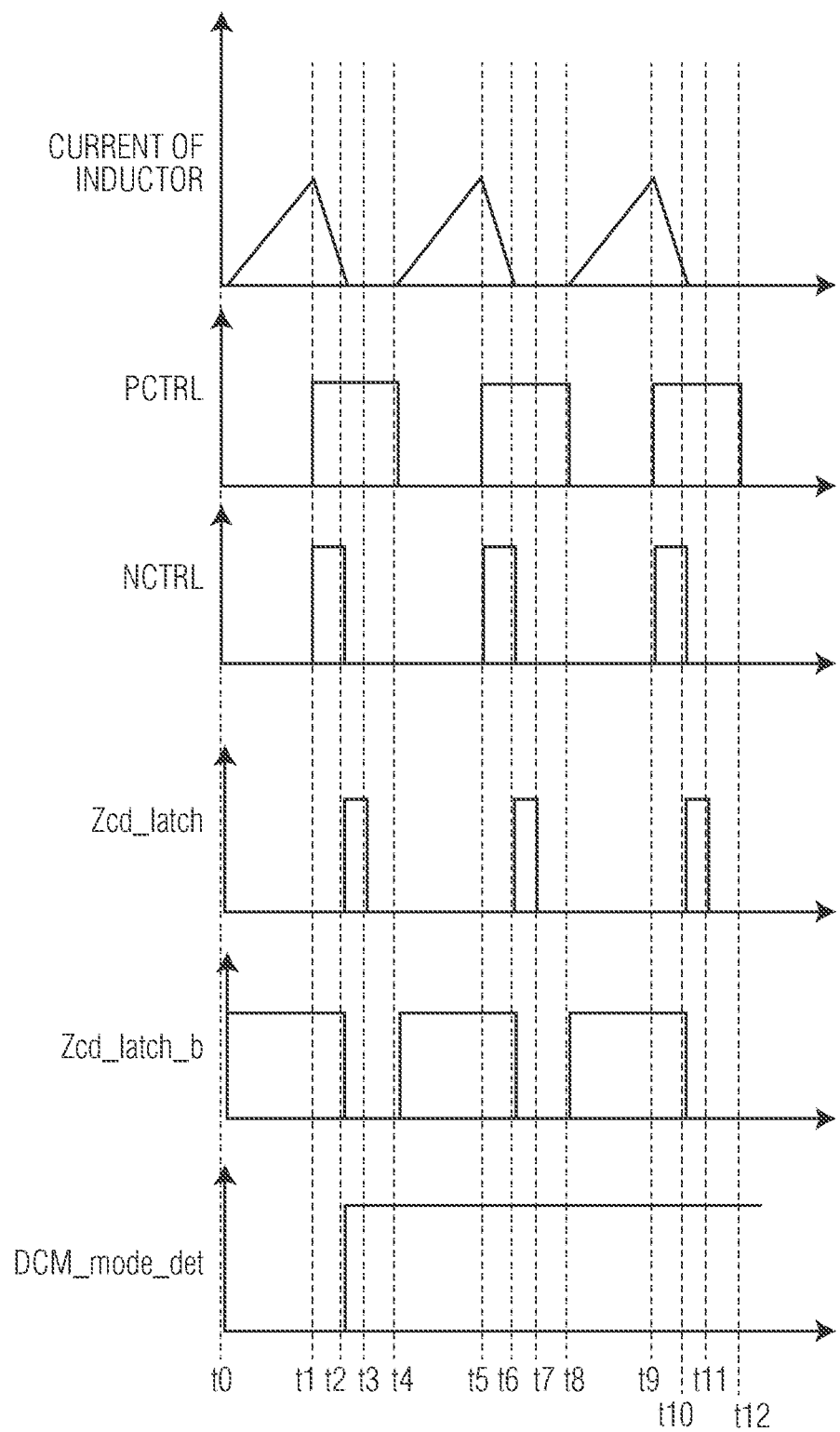
FIG. 3 is a timing diagram of example operations of the DC-DC converter of FIG. 1 during a transition from CCM mode to DCM mode for either output voltage Vout1 or Vout2.

FIG. 3 is a timing diagram of example operations of the DC-DC converter 100 of FIG. 1 during a transition from CCM mode to DCM mode for either output voltage Vout1 or Vout2. With the DC-DC converter 100 operating in CCM mode starting at time t0 with positive inductor current, DCM_mode_det is low, zcd_latch is low, and zcd_latch_b is high. During the inductor charging phase from time t0 to time t1, PCTRL and NCTRL are both low, and the inductor current rises.

An inductor discharging phase starts at time t1 with PCTRL and NCTRL both going high and the inductor current starting to fall. Note that the time offsets between the rising and falling edges in PCTRL and NCTRL are not represented in FIG. 3.

At time t2, the inductor current reaches zero, which causes zcd_batch to go high, zcd_batch_b to go low, DCM_mode_det to go high, NCTRL to go low, and PCTRL to remain high, in order to prevent the inductor current from going negative. At time t3, zcd_latch goes back low.

With DCM_mode_det remaining high, the inductor charging phase of the first full charging cycle in DCM mode begins at time t4 with PCTRL going low, which causes zcd_latch_b to go high and the inductor current to rise. The inductor discharging phase begins at time t5 with PCTRL and NCTRL both going high and the inductor current falling. At time t6, the inductor current again reaches zero, which causes zcd_batch to go high, zcd_batch_b to go low, NCTRL to go low, and PCTRL to remain high, in order to prevent the inductor current from going negative. At time t7, zcd_latch goes back low.

A similar inductor charging cycle in DCM mode is shown from time t8 to time t12.

Figure 4:
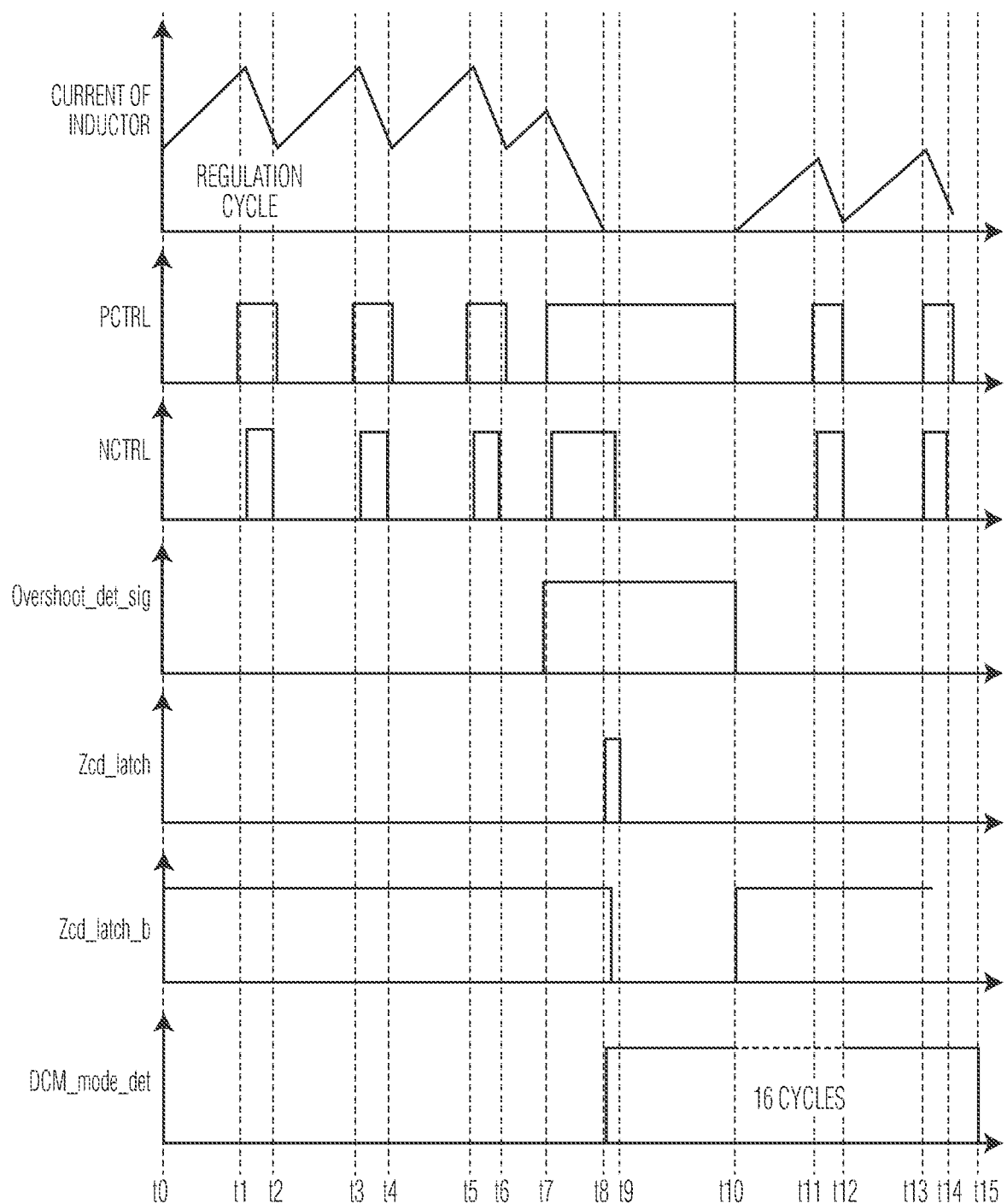
FIG. 4 is a timing diagram of example operations of the DC-DC converter of FIG. 1 during the occurrence of an overshoot condition for either output voltage Vout1 or Vout2.

FIG. 4 is a timing diagram of example operations of the DC-DC converter 100 of FIG. 1 during the occurrence of an overshoot condition for either output voltage Vout1 or Vout2. With the DC-DC converter 100 operating in CCM mode starting at time t0 with positive inductor current, DCM_mode_det is low, zcd_latch is low, and zcd_latch_b is high. During the inductor charging phase from time t0 to time t1, PCTRL and NCTRL are both low, and the inductor current rises. An inductor discharging phase starts at time t1 with PCTRL and NCTRL both going high and the inductor current starting to fall. Note that the time offsets between the rising and falling edges in PCTRL and NCTRL are represented in FIG. 4. Similar CCM charging cycles occur from time t2 to time t4 and from time t4 to time t6.

During the next inductor charging phase, which starts at time t6, the DC-DC converter 100 detects an overshoot condition at the currently selected output voltage Vout1 or Vout2 at time t7. As such, Overshoot_det_sig goes high and PCTRL and NCTRL are also driven high, and the inductor current begins to fall.

At time t8, the inductor current reaches zero, which causes zcd_latch to be high, zcd_latch_b to be low, and DCM_mode_det to be high, which in turn causes PCTRL to remain high and NCTRL to go low to prevent the inductor current from going negative. At time t9, zcd_latch is driven low.

At time t10, the DC-DC converter 100 determines that the overshoot condition at the currently selected output voltage no longer exists, such that Overshoot_det_sig is driven low, which enables the next inductor charging phase to begin at time t10, with PCTRL going low and NCTRL remaining low, which causes zcd_latch_b to go high. Two DCM charging cycles are shown from time t10 to time t12 and from time t12 to time t14. Note that the DCM duty cycle of the charging signal from time t10 to time t14 is larger than the CCM duty cycle of the charging signal from time t0 to time t6, in order to prevent the inductor current from reaching zero.

Figure 5:
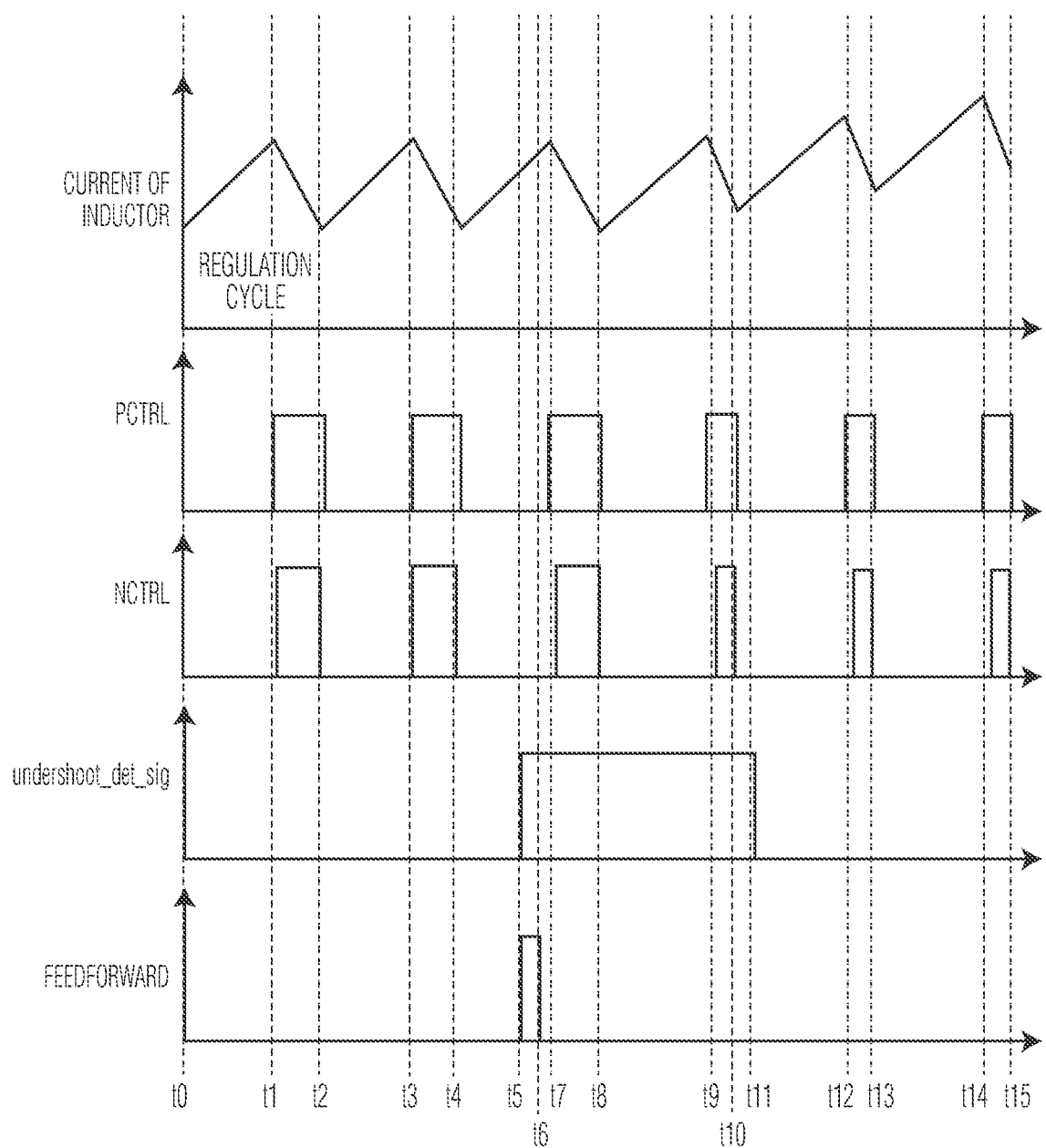
FIG. 5 is a timing diagram of example operations of the DC-DC converter of FIG. 1 during the occurrence of an undershoot condition for either output voltage Vout1 or Vout2.

FIG. 5 is a timing diagram of example operations of the DC-DC converter 100 of FIG. 1 during the occurrence of an undershoot condition for either output voltage Vout1 or Vout2. Two normal CCM charging cycles occur from time t0 to time t2 and from time t2 to time t4.

During the next inductor charging phase, which starts at time t4, the DC-DC converter 100 detects an undershoot condition at the currently selected output voltage Vout1 or Vout2 at time t5. As such, Undershoot_det_sig goes high at time t5. As a result, for the next three charging cycles from time t8 to time t10, from time t10 to time t13, and from time t13 to time t15, the duty cycle of the charging signal is increased compared to the duty cycle of the charging signal from time t0 to time t8, in order to recover from the undershoot condition. Note that, at time t11, the DC-DC converter 100 detects that the overshoot condition no longer exists Undershoot_det_sig.

Although the regulation module 108 reacts to a detected undershoot condition by adjusting the regulation signal 109 based on the specified feedforward value, in other embodiments, the DC-DC converter may handle undershoot conditions in other ways. For example, the load current can be sensed and, if the load current increases faster than a specified threshold level, the regulation module can increase the duty cycle of the charging signal faster in order to attempt to prevent the undershoot condition from occurring.

Although the DC-DC converter 100 reacts to a detected overshoot condition by turning off the switch P_SW and intermittently turning on the switch N_SW, in other embodiments, the DC-DC converter may handle overshoot conditions in other ways. For example, the load current can be sensed and, if the load current decreases faster than a specified threshold level, the regulation module can decrease the duty cycle of the charging signal faster in order to attempt to prevent the overshoot condition from occurring. Another option is to switch from DCM mode to CCM mode upon detection of an overshoot condition to allow negative current to flow through the inductor L to discharge the output capacitor for the overshot output voltage.

Although the invention has been described in the context of the DC-DC converter 100, which (i) has the undershoot detection module 128, (ii) has the overshoot detection module 126, (iii) stores duty cycles for subsequent use, and (iii) handles CCM and DCM modes differently, in other embodiments, DC-DC converters may be implemented without one or more of these features.

Although the invention has been described in terms of the switches Vout1_SW, Vout2_SW, and P_SW being p-type switches and the switch N_SW being an n-type switch, those skilled in the art will understand that one or more of the p-type switches may be n-type switches and/or the n-type switch may be a p-type switch with appropriate changes made to the circuitry that controls those switches.

Although the invention has been described in the context of the single-inductor, two-output, buck-type, DC-DC converter 100 of FIG. 1, in general, the invention can be implemented in the context of single-inductor, multiple-output, DC-DC converters having two or more outputs and for full-bridge, half-bridge, buck, boost, buck/boost, or any other suitable type of DC-DC converters as well as AC-DC converters having an initial, AC-to-DC conversion stage and a subsequent, single-inductor, multiple-output, DC-DC conversion stage.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The invention claimed is:

1. A single inductor, multiple-output, DC-DC converter that converts a DC input voltage at an input port into at least first and second output voltages at respective first and second output ports, the DC-DC converter comprising:
    an inductor;
    at least first and second capacitors respectively connected to the first and second output ports;
    a plurality of switches that selectively connect the input port to either the first capacitor or the second capacitor via the inductor; and
    regulation circuitry that controls the switches, wherein:
        the regulation circuitry determines whether the DC-DC converter is operating in continuous conduction mode (CCM) or discontinuous conduction mode (DCM);
        for the CCM mode, (i) the regulation circuitry regulates the first output voltage and (ii) the regulation circuitry regulates the second output voltage dependent on the regulation of the first output voltage; and
        for the DCM mode, (i) the regulation circuitry regulates the first output voltage independent of the regulation of the second output voltage and (ii) the regulation circuitry regulates the second output voltage independent of the regulation of the first output voltage.

2. The DC-DC converter of claim 1, wherein, for the DCM mode, the regulation circuitry (1) generates and saves (i) a first regulation signal for the first output voltage and (ii) a second regulation signal for the second output voltage and (2) retrieves and uses (i) the saved first regulation signal for a subsequent DCM charging period for the first output voltage and (ii) the saved second regulation signal for a subsequent DCM charging period for the second output voltage.

3. The DC-DC converter of claim 2, wherein, for the CCM mode, the regulation circuitry (1) generates and saves the first regulation signal for the first output voltage and (2) retrieves and uses the saved first regulation signal (i) for a subsequent CCM charging period for the first output voltage and (ii) for a subsequent CCM charging period for the second output voltage.

4. The DC-DC converter of claim 1, wherein the regulation circuitry detects whether an undershoot condition exists at a currently selected output voltage and controls the switches differently depending on whether or not the undershoot condition is detected.

5. The DC-DC converter of claim 4, wherein, when the regulation circuitry detects the undershoot condition, the regulation circuitry controls the switches to increase a duty cycle of a charging signal for the currently selected output voltage more than if the undershoot condition were not detected.

6. The DC-DC converter of claim 4, wherein, for both the CCM mode and the DCM mode, the regulation circuitry detects the undershoot condition based on the currently selected output voltage, but not the other output voltage.

7. The DC-DC converter of claim 1, wherein the regulation circuitry detects whether an overshoot condition exists at a currently selected output voltage and controls the switches differently depending on whether the overshoot condition is detected.

8. The DC-DC converter of claim 7, wherein, when the regulation circuitry detects the overshoot condition, the regulation circuitry controls the switches to stop charging the currently selected output voltage from the input port until the overshoot condition does not exist.

9. The DC-DC converter of claim 7, wherein:
    for the CCM mode, the regulation circuitry detects the overshoot condition based on a common-mode sensed voltage based on the first and second output voltages; and
    for the DCM mode, the regulation circuitry detects the overshoot condition based on the currently selected output voltage, but not the other output voltage.

10. The DC-DC converter of claim 1, wherein the regulation circuitry detects when a voltage at the inductor crosses zero to determine that the DC-DC converter is operating in the DCM mode.

11. The DC-DC converter of claim 1, wherein the regulation circuitry selects one of the first and second output voltage that is relatively more deficient as a currently selected output voltage to be regulated.

12. The DC-DC converter of claim 11, wherein:
for the CCM mode, the regulation circuitry regulates the currently selected output voltage based on a common-mode sensed voltage based on the first and second output voltages; and
for the DCM mode, the regulation circuitry regulates the currently selected output voltage based on the currently selected output voltage, but not the other output voltage.

13. The DC-DC converter of claim 1, wherein, for the CCM mode, the regulation circuitry regulates the first output voltage independent of the regulation of the second output voltage.

14. The DC-DC converter of claim 1, wherein, for the CCM mode, the regulation circuitry regulates the first output voltage dependent on the regulation of the second output voltage.

* * * * *